United States Patent Office 3,121,871
Patented Feb. 18, 1964

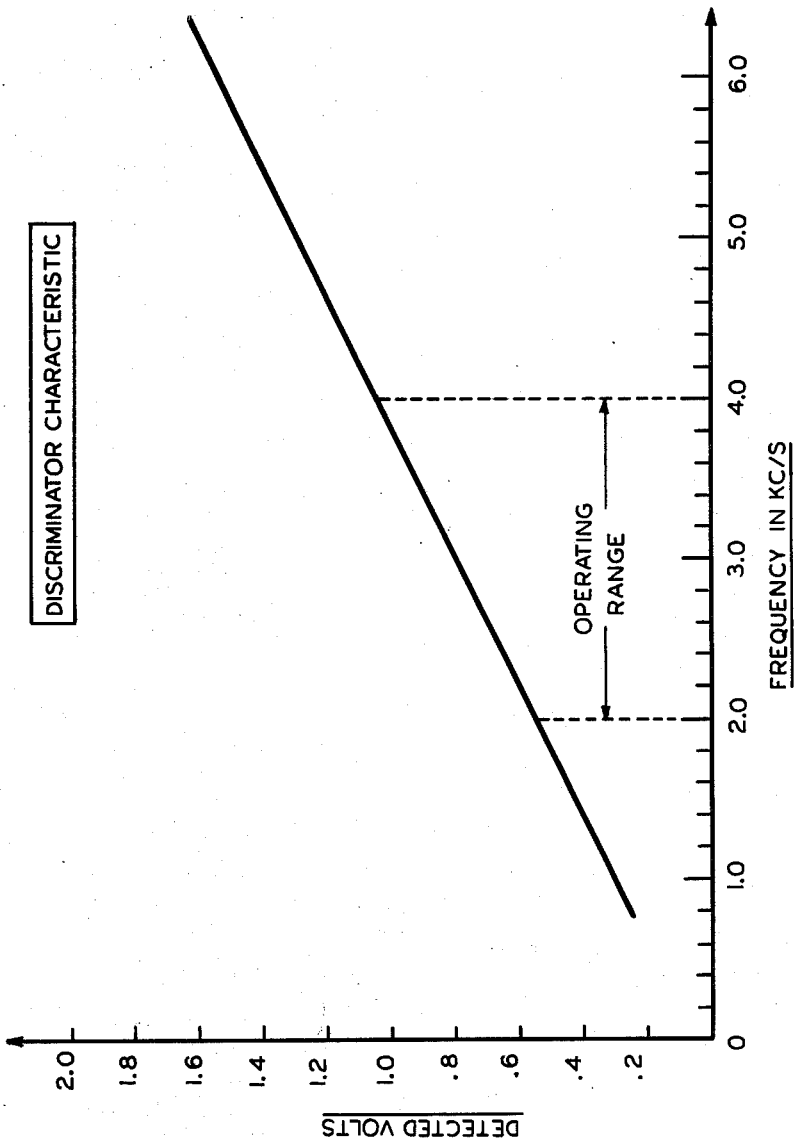

3,121,871
DIRECTION FINDING SYSTEM
John M. Beukers, Stony Brook, N.Y., assignor to Servo
 Corporation of America, Hicksville, N.Y., a corporation of New York
Filed Feb. 27, 1962, Ser. No. 176,068
9 Claims. (Cl. 343—113)

My invention relates to an improved direction finder of the type commonly referred to as a wide aperture Doppler direction finder.

A multiplicity of extraneous signal types are encountered in the high frequency band, such types being steady carriers, keyed carriers, narrow-band frequency shift, wide-band frequency shift, various forms of multiplexed signals, AM, FM, single sideband and so on. In particular my invention relates to a wide aperture Doppler direction finder for use in the high frequency band of frequencies where such frequency modulated and phase modulated signals are common occurrences and which functions effectively to indicate the direction of a specific incoming carrier signal.

The general principles of wide aperture Doppler direction finders have been described in Hensel United States Letters Patent No. 2,481,509. In general, such Doppler systems utilize an effective revolving receiving antenna to impress a phase or space modulated wave upon the incoming carrier signal. Quasi-Doppler systems utilize a number of equispaced antennas located on a circle such that the electrical distance between adjacent antennas never exceeds 180°. Each antenna is sequentially connected to a receiver by means of a commutator to provide a simulated revolving receiving antenna. The effect of the commutation process is to move the point of signal reception simulating the revolving antenna thereby imposing a space or phase modulation upon incoming signals. In such Doppler or quasi-Doppler systems, a low frequency reference signal is produced in accordance with the effective angular velocity of the revolving antenna. Such frequency is related to the period of revolution of the revolving antenna and is related to the instantaneous position of the rotating antenna. The relative phase of the detected phase modulation when compared with or related to the instantaneous position of the revolving antenna is a measure of the bearing of the arriving carrier signal and may be used for direction finding purposes.

My invention utilizes the commutated array but it is understood that operation with a physically revolving antenna is essentially the same insofar as the principles of this invention apply.

The phase or spaced modulated signal is applied to an amplitude limiter to remove amplitude modulation components and thereafter such signal is supplied to a frequency or phase detector to extract the bearing modulation from the modulated carrier waves. The phase of the detected signal and the reference signal are compared and the phase difference is the measure of bearing or direction of the incoming carrier signal.

In certain applications there are encountered frequency or phase varying signals of the type mentioned particularly in high frequency band which introduce inaccuracies. As an example, in the case of FSK (frequency shift keying) there is employed frequency modulation in which the modulating wave shifts the output discontinuously between predetermined values. Such a system introduces distortion because the phase modulation produced by the commutated array is much smaller than the relatively larger changes introduced by the frequency shift keyed (FSK) signals. In general a basic problem in the above described Doppler type direction finder lies in its difficulty, in the presence of extraneous frequency varying signals mentioned above, to detect the bearing phase modulation.

Therefore, a primary object of this invention is to provide a system which removes the above described deficiencies.

A second object of this invention is to provide a wide aperture Doppler system which operates satisfactorily in the presence of extraneous or transient frequency changes.

Still another object of this invention is to provide a second receiver which functions as a frequency reference to remove phase and frequency modulation from the incoming carrier.

Yet another object of this invention is to provide a wide aperture Doppler direction finder which allows the bearing information to be carried by a low frequency carrier thereby allowing the utilization of a highly linear frequency discriminator.

Yet another object of this invention is to provide a low frequency carrier thereby permitting a high degree of selectivity to be achieved using a single tuned circuit filter.

It is known that the expression for a carrier wave, phase modulated by the commutation process may be expanded and defined in terms of sidebands. From such an analysis, it is possible to pass a given percentage of information energy. It is evident that greater bandwidth is required to pass an increased percentage of information energy. In general the bandwidth necessary to pass this increased percentage of energy is substantially greater than the selectivity of the receiver.

It is possible to decrease the bandwith containing a given amount of information by reducing the scan rate (rate of revolution of receiving antenna) since the frequency separation of the sidebands is directly related to the scan rate. However, it must be remembered that the system must receive small Doppler frequency changes in the presence of much larger changes from the extraneous frequency and phase varying signals described above. By reducing the scan rate, the situation is aggravated.

My invention permits a reduction in scan rate and a consequent receiver bandwidth reduction since the undesired frequency and phase modulation is substantially eliminated in a manner which is substantially independent of scan rate.

Briefly, in my invention I utilize a commutated Doppler array producing a phase modulated signal which is applied to a first channel. I further utilize a second receiving channel which functions as a frequency reference to remove phase and frequency modulation from incoming carriers.

The signals received in each channel are applied to couplers containing mixers and oscillators to reduce the frequency to intermediate (IF) frequencies. However, the oscillators in these couplers are set to produce slightly different frequencies, frequencies which may differ by a frequency in the audio range, for example, by approximately 3 kilocycles. The output from the respective couplers are applied to novel amplitude limiting circuits so as to remove the amplitude modulation without introducing a further frequency of phase modulation. By the use of such limiters, phase modulation due to amplitude variations of the input signal is minimized. The outputs from these limiters are then applied to a data extractor from which a bearing signal is determined.

The novel data extractor comprises a mixer which beats the two IF frequencies together to produce a low frequency beat signal which carries the bearing modulation. This signal is applied succesively to limiting circuits and then to a linear frequency discriminator the output of which is a signal containing the bearing information. This signal in conjunction with a standard reference signal produced in accordance with the rate of commutation is applied to a conventional phase comparator to produce an accurate indication of bearing.

The selectivity of the system is that of the receiver bandwidth, however, the low final intermediate frequency of 3 kc. permits additional selectivity to be achieved by placing a single high Q tuned circuit in the plate of the mixer. In this manner bandwidths of the order of 100 c.p.s. may easily be produced.

The prior art has recognized the use of two channels one of which is a conventional commutated array and the second of which is a reference channel but such prior art systems utilize a coherent oscillator to produce intermediate frequencies. It is an important object of my invention to eliminate the necessity of using coherent frequency oscillators. I mean by this that oscillators are coherent when their frequencies are identical and in phase correspondence. My invention must use a frequency discriminator since it employs a frequency reference. It does not use a phase discriminator which can only be utilized when the oscillators in the system are coherent. Since my system utilizes the entire frequency spectrum of the Doppler modulated carrier signal, the total informational content is utilized In a preferred aspect of the system, a highly linear frequency discriminator which operates at a low frequency is employed. Such discriminator is less prone to drift and results in higher accuracy of the direction finder. The low beat frequency allows a high degree of selectivity to be simply and easily obtained. Further, symmetrical limiters are used to eliminate any spurious amplitude modulation impressed by the commutator or present on the incident carrier.

As stated, an analysis of the phase modulated carrier signal indicates that a spectrum of frequencies is produced and that the index of modulation (defined as the ratio of the frequency deviation to the frequency of the modulating wave) is dependent upon the aperture of the system which is in turn dependent upon the diameter of the array or the diameter of the path of the revolving antenna. In the invention described herein, no selectivity is made of any particular spectrum so that all of the bearing information is utilized.

The above-mentioned and other features and objects of this invention and the manner of attaining them will become more apparent and the invention itself will be best understood by reference to the following description of an embodiment of the invention taken in conjunction with the accompanying drawings, wherein:

FIG. 4 is a graph of the characteristics of the linear frequency discriminator.

System

Figure 1:
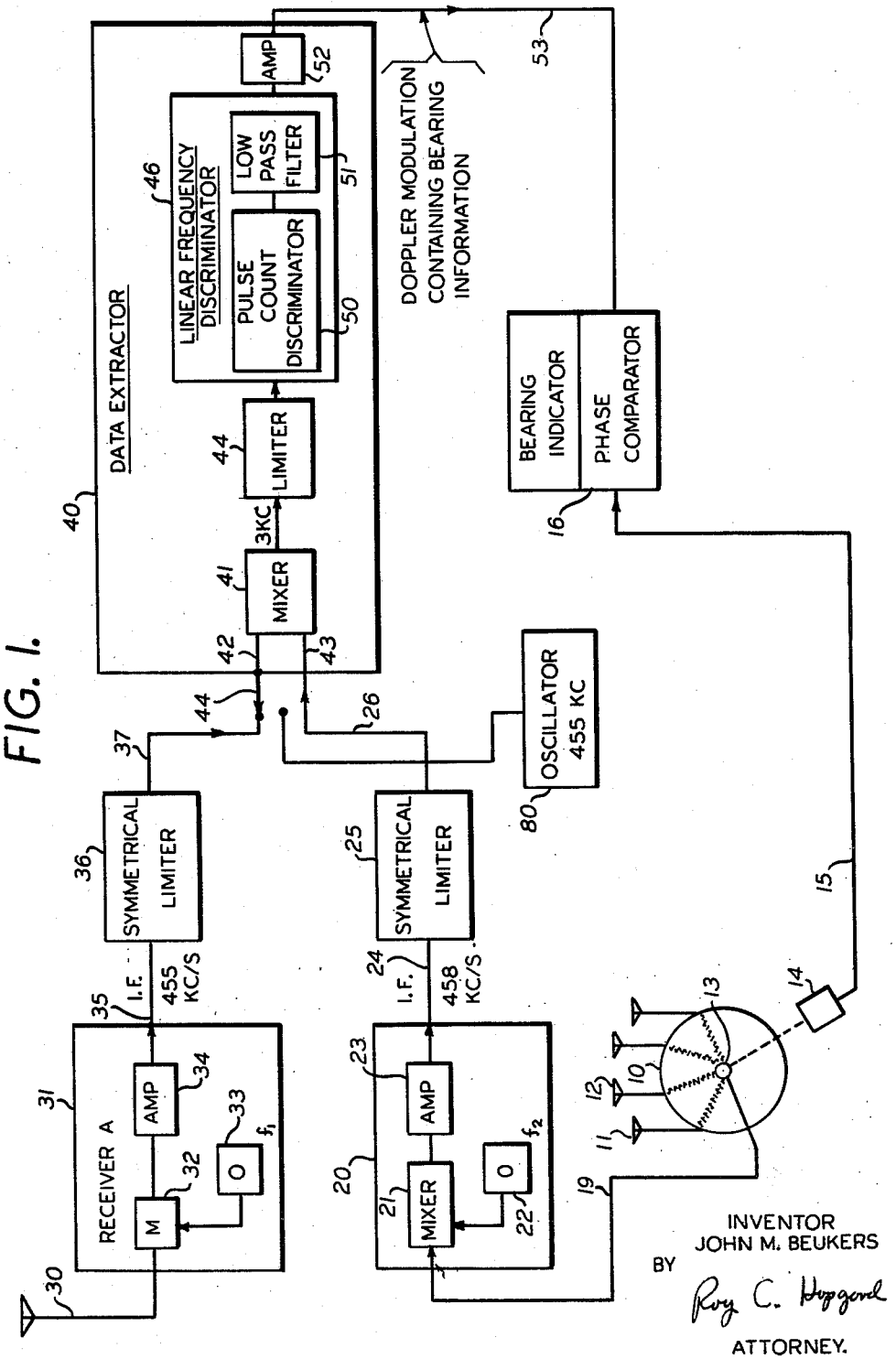
FIG. 1 is a block diagram of any novel invention.

Referring now to the drawings, there is shown in FIGURE 1 a system comprising an effective revolving antenna 10. In the embodiment shown, a plurality of antennas 11, 12, etc., are positioned at equally spaced apart intervals along the circumference of a circle. The electrical distance between adjacent antennas never exceeds 180°. The diameter of the circle is one wavelength or more thereby constituting a wide aperture system. A commutator shown only diagrammatically at 13 is utilized to couple the received energy from each of the antennas 11, 12 to a conductor 13. In a preferred embodiment twenty-five (25) antennas are utilized, and each antenna is sequentially switched to a receiver. The signal appearing on lead 19 may therefore be said to carry the bearing modulation component. This in effect means that the carrier signal derived from the antenna array has phase modulation whose phase is determined in accordance with the bearing of the incoming carrier signal.

Means for driving the revolving element of the commutator are shown at 14 and such means also produce an alternating current reference signal at a frequency corresponding to the rate of revolution of the commutator. This reference signal appears over lead 15 and is applied to one terminal of a phase comparator 16.

The phase modulated carrier signal is applied from lead 19 to coupler 20, the output of which is applied to a novel limiter 25. At the coupler 20, the phase modulated signal is applied to a mixer 21 to which is also applied a frequency $f2$ from an oscillator 22. The output of mixer 21 is applied to an amplifier 23. The output therefore of the coupler 20 is an IF carrier carrying the bearing modulation.

There is also provided a reference antenna 30 spaced apart from or within the array 10, the output of which is applied to a second coupler 31 generally similar to the coupler 20. Actually couplers 20 and 31 include circuitry usually found in conventional receivers. However, coupler 31 utilizes a mixer 32 and an oscillator 33 having a frequency $f1$ which differs from the frequency of oscillator 22. The carrier signal received from antenna 30 is applied to mixer 32 along with signal $f1$ from oscillator 33. The output of mixer 32 may be applied to an amplifier 34. An IF frequency which does not carry the bearing modulation appears on lead 35.

The oscillators 33 and 22 operate at different frequencies but the frequencies differ only by a small amount so that the difference in frequency between the oscillators falls in the general low frequency audio range. In the embodiment shown, the IF frequency appearing on lead 24 may be 458 kilocycles while the IF frequency appearing on lead 35 may be 455 kilocycles. The IF frequency signal appearing on lead 35 is applied to limiter 36 which is similar to limiter 25. The outputs from limiter 25 and the output from limiter 36 are applied to a data extractor 40 over leads 26 and 37, respectively. The data extractor produces a low frequency data signal of a frequency equal to that of the reference signal frequency. This data signal appears on lead 53.

Figure 2:
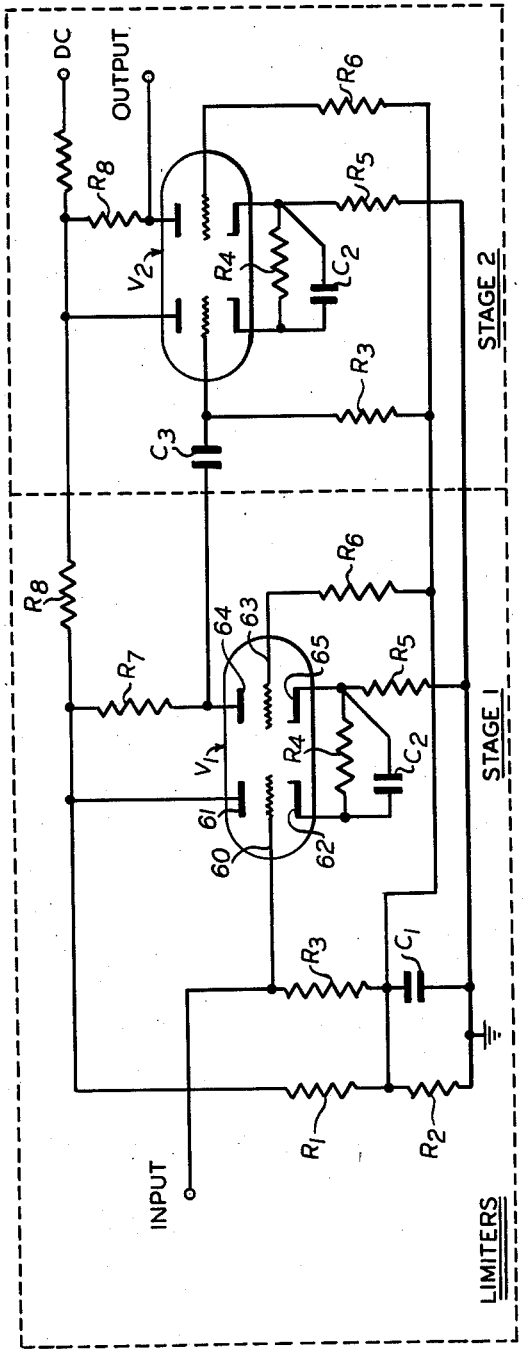
FIG. 2 is a circuit diagram of the symmetrical limiters used in the system shown in FIG. 1.

The limiters 25 and 36 are of novel construction providing symmetrical limiting. Asymmetrical limiting is undesirable since amplitude modulation produced by asymmetrical modulation may cause phase or frequency modulation thereby impairing the accuracy of the system. In the preferred embodiment, two stages of limiting are used. The limiters are shown in more detail in FIG. 2 to which reference is now made.

Symmetrical Limiter

The symetrical limiter is generally of the cathode coupled variety and employs a double triode V1, the first triode having a grid 60, plate 61 and a cathode 62 and the second triode having a grid 63, plate 64 and cathode 65. The input signal is applied directly to grid 60. A series RC circuit comprising resistor R3 and capacitor C1 is connected from grid 60 to ground with the resistor being connected to the grid. The signal appearing at the common connection of resistor R3 and capacitor C1 is coupled to the grid 63 of the second triode through a series resistor R6. A voltage divider network comprising series resistors R1 and R2 are connected across plate P1 to ground with the intermediate terminal also being connected to the common connection between resistors R3 and C1. This series resistor circuit serves to place a bias on the grid 63. The cathodes 62 and 65 of the two triodes have a common cathode resistor R5. A load resistor R7 appears in the plate circuit of the second triode.

A particularly novel feature of this circuit is the embodiment of a balancing resistor R4 connected between cathodes 62 and 65 since the plate has a high load. Inasmuch as only the plate circuit of the second triode has a load resistor, the balancing resistor R4 functions only to balance the D.C. current flowing through the first triode. In order to prevent any of the RF or high frequency voltages from appearing across resistor R4, a shunting capacitor C2 is utilized. The circuit described is intended to produce symmetrical limiting and exemplary values of the circuit components are given herein:

| | |
|---|---|
| R1 | 470K |
| R2 | 100K |
| R3 | 470K |
| R4 | 150 |
| R5 | 3900 |
| R6 | 100 |
| R7 | 4.7K |
| R8 | 1000 |
| C1 | $\mu\mu f$ .01 |
| C2 | $\mu\mu f$ .1 |
| C3 | $\mu\mu f$ 750 |
| V-1 | 6922 |
| V-2 | 6922 |

The second stage of limiting operates in the same fashion as stage 1. The second stage has a low plate load or resistor and therefore current in the two tubes is almost equal obviating the need for the balancing resistor. The first stage of the symmetrical limiter removes the major amount of amplitude modulation and in that sense, is of more importance than the second stage. Therefore in certain second stage embodiments, the balancing resistor R4 and shunting condenser C2 may be eliminated.

In operation, the resistors R1 and R2 connected in series across the power supply provide a bias voltage for all of the grids of the triodes. The intermediate terminal at which R1 and R2 are connected is connected to the grid of the first triode through resistor R3 and the grid 63 of the second triode through resistor R6. Further, this intermediate terminal is connected to the grids of both triodes in the tube of the second stage through similar resistors R3 and R6. A capacitor C1 is connected from this intermediate point to ground. The voltage appearing at this intermediate terminal is effectively a D.C. voltage and the A.C. currents are shunted to ground across capacitor C1.

In operation, both triodes of tube V1 act as a double ended limiter. The grids are so biased that only a limited range of operation is allowed before the triodes reach cut off.

The first triode of tube V1 acts as a cathode follower, the output of which is applied to the cathode 65 of the second triode. When the input signal to grid 60 is a positive voltage, the cathode 65 of tube 2 is at the same positive voltage which, in effect, puts grid 63 at a relatively negative voltage. When the input signal exceeds a predetermined positive voltage, the grid 63 becomes sufficiently negative so that the second triode reaches cut off.

When the input voltage on grid 60 exceeds a predetermined negative voltage, the first triode reaches cut off which limits the negative voltage applied to cathode 65.

In effect, therefore, the two triodes operate such that one cuts off when the input voltage exceeds a predetermined positive value and the other cuts off when the input voltage exceeds a predetermined negative value.

Data Extractor

Referring now back to FIG. 1, the data extractor comprises a conventional mixer 41 to which the IF frequencies are applied over leads 42 and 43. The output from mixer 41 is a low frequency signal in the audio range which carries the bearing modulation. In the embodiment shown the low frequency signal is 3 kilocycles which equals the difference between the frequencies of oscillators 22 and 33. The output from mixer 40 is again applied to a second symmetrical limiter 44.

At this time it may be recognized that any extraneous or transient frequency modulation which may be produced is cancelled as the IF frequencies are combined at mixer 41 which produces a difference frequency. Any change in frequency introduced by FSK or the like appears on both signals (those which appear on leads 24 and 35) and are therefore removed at mixer 41 and do not appear in the low frequency output thereof.

The oscillators which are employed in this invention, namely, oscillators 22 and 33, do not have to be coherent and may operate out of phase since the comparison made is of frequency and not of phase. This, in conjunction with discrimination occurring in a relatively low frequency range allows for the use of a highly linear frequency discriminator 46.

Linear Discriminator

Figure 3:
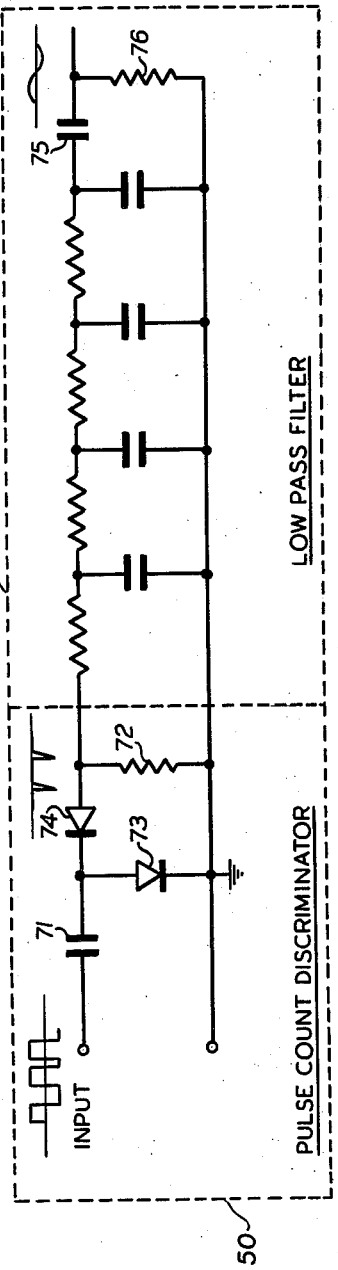
FIG. 3 is a circuit diagram of the linear frequency discriminator shown in FIG. 1.

The linear discriminator is shown in more detail in FIG. 3. This discriminator comprises a pulse count discriminator 50 having a differentiator and gate circuit means and a low pass filter 51.

The input signals which emanate from limiter 44 comprise a series of essentially square waves, the frequencies of which vary. The differentiator comprises a series capacitor 71 and a shunting resistor 72. This filter integrates the signals from pulse count discriminator 50 as well as removing all high frequency components. The output from low pass filter 51 may be applied through a conventional amplifier 52 and then over lead 53 to the phase comparator 16.

The highly linear characteristics of the discriminator are shown in FIG. 4.

A gate comprising a series diode 74 which is poled to allow negative signals to pass and a shunting diode 73 poled so as to shunt positive signals is utilized. The series connected diode 74 passes the negative pulses and prevents the positive pulses, which are naturally produced when a square wave is differentiated, from passing and shunting diode 73 passes such pulses to ground.

The low pass filter is conventional, comprising a ladder connection of series resistors and parallel capacitors. This low pass filter also includes a series capacitor 75 and a parallel resistor 76 over which the output signal may be applied to an amplifier. The low pass filter in conjunction with the pulse counter discriminator provide a highly linear frequency discriminator.

Alternate Reference Channel

In the situation where there are no frequency disturbances, such as FSK signals, it may be desirable to eliminate the use of the reference signal obtained from antenna 30 and therefore an oscillator 80, shown in FIG. 1, operating at a frequency of 450 kilocycles may be connected directly to the mixer 41 by switching lead 42 to the oscillator by means of a switch 44.

While the foregoing description sets forth the principles of the invention in connection with specific apparatus, it is to be understood that the description is made only by way of example and not as a limitation of the scope of the invention as set forth in the objects thereof and in the accompanying claims.

I claim:

1. A system for determining the direction from which an electromagnetic wave emanates comprising Doppler wave receiving means receiving said wave including revolving means for effectively revolving said wave receiving means about a center point at a substantially uniform angular velocity including means producing a first signal at a frequency in accordance with said angular velocity of said revolving means, whereby said revolving means imposes a phase modulation on said wave, said phase modulated wave appearing at the output of said Doppler wave receiving means, phase comparator means producing an indication of bearing depending on the phase between two received waves and having first and second inputs, said first signal being coupled to said first input, reference wave receiving means receiving said wave simultaneously with said Doppler wave receiving means, data extractor means having an output, first coupling means coupling said Doppler wave receiving means to said data extractor means, second coupling means coupling said reference wave receiving means to said data extractor means, means coupling the output of said data extractor means to the second input of said phase comparator means, said data extractor including mixing means mixing said wave from said first coupling means with the wave from said second coupling means to produce a beat frequency signal having said phase modulation imposed thereon, said data extractor further including frequency discriminating means to extract said phase modulation from said beat frequency signal and produce a data signal carrying bearing information, said data signal appearing at the output of said data extractor means.

2. The system of claim 1 in which said first coupling means includes a mixer and a first oscillator in which said phase modulated wave and the output of said first oscillator are mixed producing a first IF signal at a first frequency carrying said phase modulation whereby said first IF phase modulated signal is applied to said data extractor means, and in which said second coupling means includes a second oscillator producing a signal at a frequency differing from the frequency of said first oscillator and a mixer in which said reference wave and the output of said second oscillator are mixed producing an IF signal of a frequency differing from the frequency of said first IF phase modulated signal.

3. The system of claim 2 in which each of said first and second coupling means includes first and second symmetrical limiters coupled to the outputs of said respective mixers.

4. The system of claim 3 in which said symmetrical limiters comprise a cathode coupled limiter having a first electron device with a plate, grid and cathode, and a second electron device having a plate, grid and cathode, a common cathode resistor, whereby said first electron device operates as a cathode follower, a load resistor in the plate circuit of said second electron device, said cathode resistor being connected to said second cathode, and a balancing resistor between said first cathode and second cathode and a shunting capacitor across said balancing resistor whereby, D.C. current flows across balancing resistor and the A.C. current flows effectively across said capacitor.

5. A symmetrical cathode coupled limiter having a first electron device with a plate, grid and cathode, and a second electron device having a plate, grid and cathode, a common cathode resistor, whereby said first electron device operates as a cathode follower, a load resistor in the plate circuit of said second electron device, said cathode resistor being connected to said second cathode, and a balancing resistor between said first cathode and second cathode and a shunting capacitor across said balancing resistor whereby, D.C. current flows across balancing resistor and the A.C. current flows effectively across said capacitor.

6. The system of claim 1 in which said data extractor comprises a mixer which mixes the signals from said first and second coupling means to produce a low frequency beat signal carrying the bearing modulation, limiting means coupled to the output of said mixer and a highly linear low frequency discriminator, said frequency discriminator comprising differentiating gating means and low pass integrating filter coupled to the output of said differentiating gating means.

7. A system for determining the direction from which a carrier wave emanates comprising Doppler wave receiving means receiving said wave including revolving means for effectively revolving said wave receiving means about a center point at a substantially uniform angular velocity including means producing a first signal at a frequency in accordance with said angular velocity of said revolving means, whereby said revolving means imposes a phase modulation on said wave, said phase modulated wave appearing at the output of said Doppler wave receiving means, phase comparator means producing an indication of bearing depending on the phase between two received waves and having first and second inputs, said first signal being coupled to said first input, reference wave receiving means receiving said wave simultaneously with said Doppler wave receiving means, a first oscillator and a first mixer, means to couple the output of said Doppler wave receiving means and said first oscillator to said mixer to extract an IF carrier signal containing the bearing modulation, symmetrical limiting means coupled to the output of said mixer, a second mixer, means to couple the output of said symmetrical limiting means to said second mixer, a reference mixer, a second oscillator operating at a frequency different from that of said first oscillator, said reference wave receiving means and said second oscillator being connected to said reference mixer, second symmetrical limiting means, means connecting the output of said reference mixer to the input of said second symmetrical limiting means, the output of said second symmetrical limiting means being connected to said second mixer, amplitude limiting means coupled to the output of said second mixer and a linear frequency discriminator coupled to the output of said amplitude limiting means, and means coupling the output of said linear frequency discriminator to said phase comparator.

8. The system of claim 7 in which said linear frequency discriminator comprises a pulse count discriminator means and a low pass filtering means.

9. A process for determining the bearing of a carrier wave signal comprising the steps of:

receiving said carrier wave by an effectively revolving antenna to produce a phase modulated carrier signal, the path of revolution having a diameter of one wavelength or more, producing a low frequency comparison signal in accordance with the period of the revolving antenna, simultaneously receiving said carrier signal at a stationary reference station to produce a reference signal, reducing the frequency of said phase modulated carrier signal and said reference signal by respective amounts which differ from each other by a frequency generally in the audio low frequency range, amplitude limiting both signals and thereafter mixing said signals, whereby a low frequency signal carrying the bearing information is produced by said mixing, frequency discriminating said phase modulated carrier wave and comparing such signal with said comparison signal to determine the bearing of said carrier signal.

References Cited in the file of this patent

UNITED STATES PATENTS

| | | |
|---|---|---|
| 2,276,565 | Crosby | Mar. 17, 1942 |
| 2,860,336 | Earp et al. | Nov. 11, 1958 |